United States Patent [19]

Neely

[11] 4,271,753
[45] Jun. 9, 1981

[54] BREWING MECHANISM
[75] Inventor: Raymond J. Neely, Lansdale, Pa.
[73] Assignee: Refreshment Machinery Incorporated, Warminster, Pa.
[21] Appl. No.: 93,881
[22] Filed: Nov. 23, 1979
[51] Int. Cl.³ ............................................. A47J 31/00
[52] U.S. Cl. .................................................. 99/289 R
[58] Field of Search ............. 99/289 R, 289 T, 289 D, 99/289 P, 283, 279, 280, 295, 300, 302 R

[56] References Cited
U.S. PATENT DOCUMENTS

| | | | |
|---|---|---|---|
| 3,213,777 | 10/1965 | Heier | 99/289 T |
| 3,349,690 | 10/1967 | Heier | 99/289 R |
| 3,440,952 | 4/1969 | Merola | 99/289 R |
| 3,496,861 | 2/1970 | Stahler | 99/289 R |
| 3,573,860 | 4/1971 | Bentzman | 99/289 R |
| 3,660,117 | 5/1972 | Neely | 99/289 R |

Primary Examiner—Robert W. Jenkins
Attorney, Agent, or Firm—Seidel, Gonda, Goldhammer & Panitch

[57] ABSTRACT

Apparatus is disclosed for use in brewing single cup quantities of a beverage such as coffee. A frame supports a vertically movable open-bottom cylinder and a piston within the cylinder. A base assembly is reciprocal horizontally between the brewing position and a discharge position. In the brewing position, a brewing cavity is disposed beneath and sealed with the cylinder. Actuation of various components through a predetermined repetitive cycle is controlled by a motor driven camshaft.

13 Claims, 28 Drawing Figures

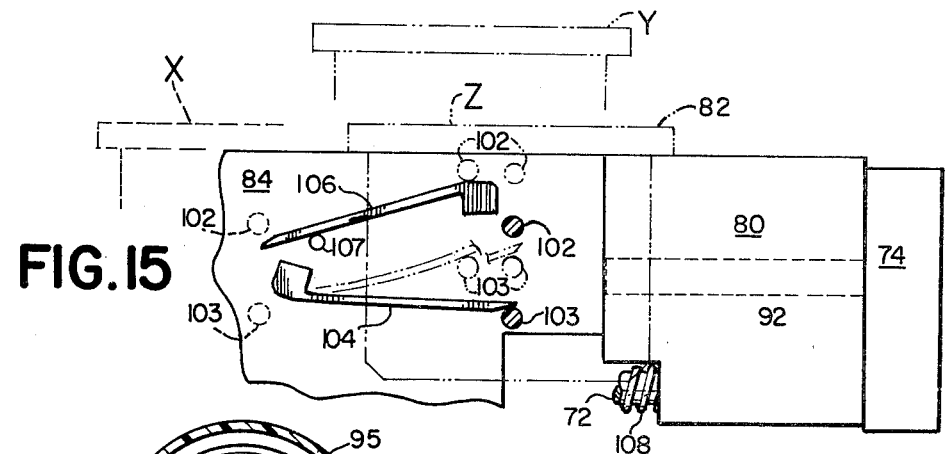
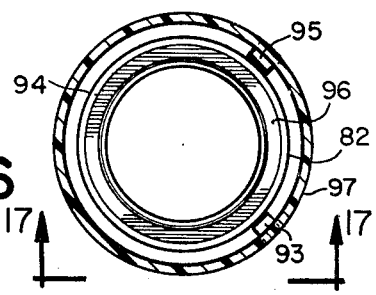
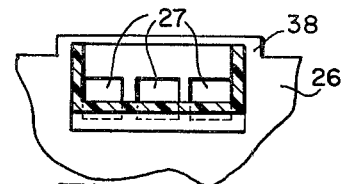
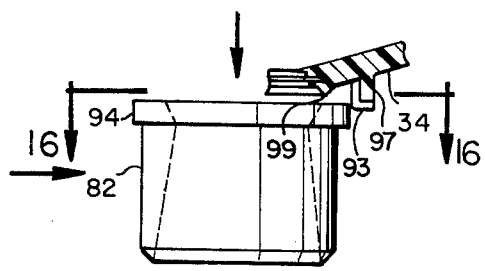
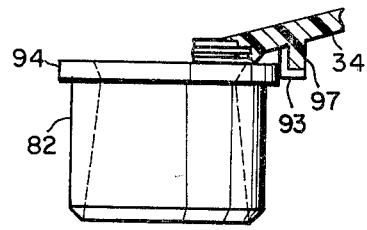
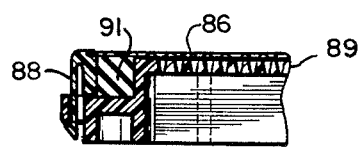

BREWING MECHANISM

BACKGROUND

Brewing apparatus of the general type involved herein is known in the art. For example, see U.S. Pat. No. 3,660,117 and the patents cited therein. The present invention is an improvement over the apparatus disclosed in said patent.

SUMMARY OF THE INVENTION

The present invention is directed to a brewing mechanism for brewing a beverage such as coffee. The mechanism includes a frame which supports a vertically moveable open-bottom cylinder. A vertically moveable piston is disposed within the cylinder at each of the upper and lower ends of the piston stroke. A first spring means biases the piston upwardly. A means is provided to facilitate entry of water into the cylinder at a location below the elevation of the piston.

A brewing mechanism of the present invention also includes a base assembly which is reciprocable generally horizontally between a brewing position and a discharge position. The base assembly includes a brewing cavity which is disposable beneath and sealed with the cylinder in the brewing position of the assembly. A second spring means biases the assembly toward said discharge position. A plurality of cams are provided on a camshaft driven by a motor. A first cam follower is provided on the piston, the second cam follower is provided on the cylinder. Each cam follower is in contact with a discreet one of the cams on the camshaft. The first spring means cooperates with one of the cams to aid said motor in moving said base assembly toward the brewing position.

The present invention is directed to a miniaturized compact brewing mechanism which gives better performance, increased brew extraction time, and the cams are designed to synchronize with one another mathematically and thereby aid each other in their operational function whereby the size requirement for the motor is smaller than that of the prior art.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

FIG. 13 is a sectional view taken along the line 13—13 in FIG. 9;

Figure 1:
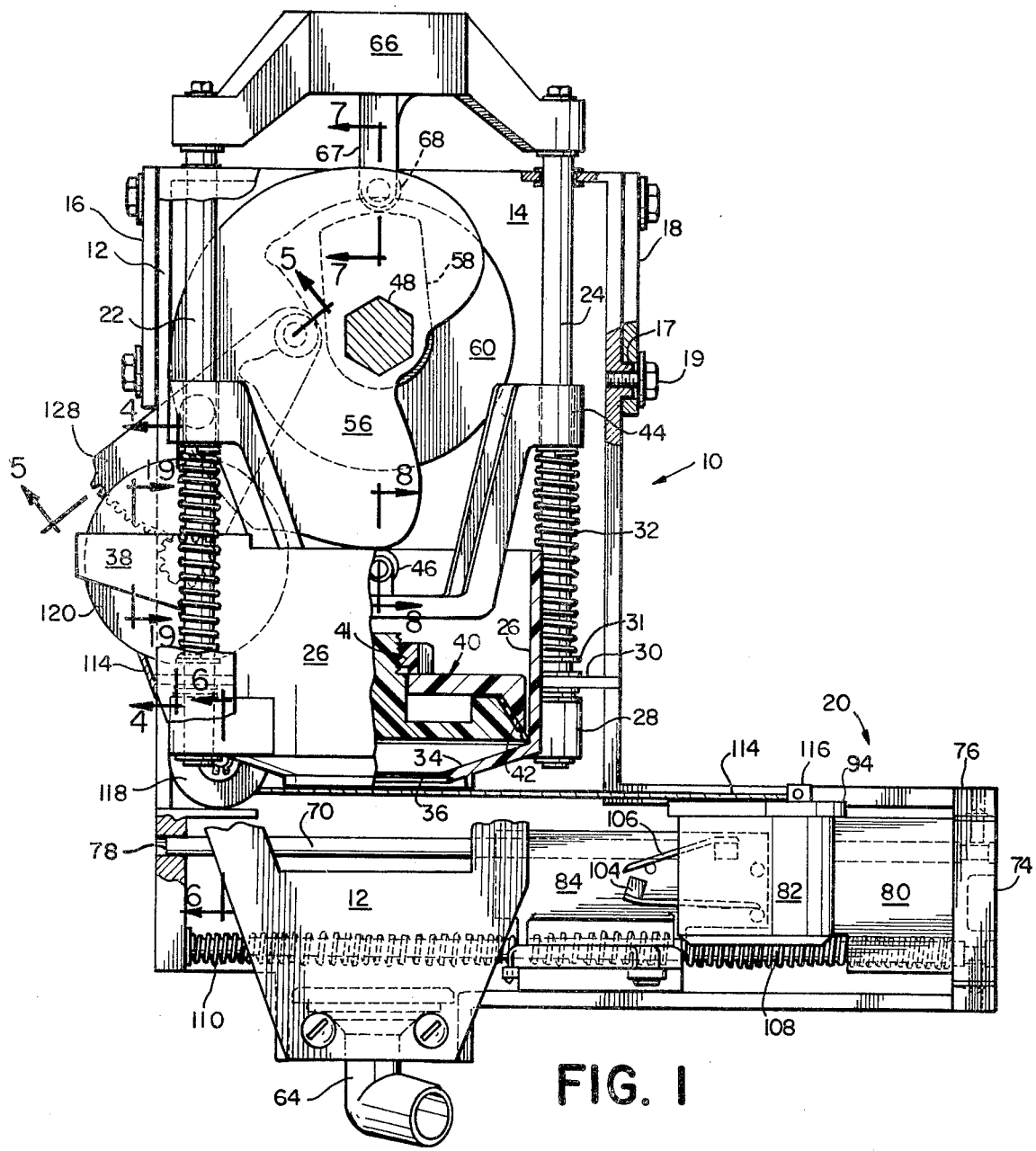
FIG. 1 is a front elevation view of the brewing mechanism of the present invention.
Figure 10:
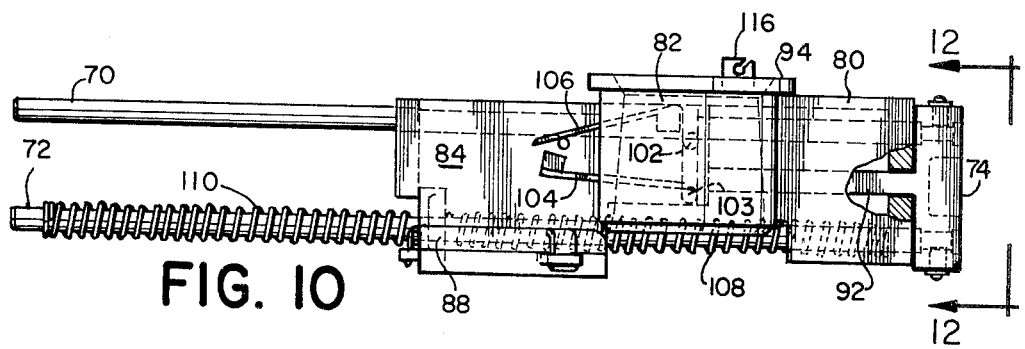
FIG. 10 is a front elevation view of the base assembly.

FIG. 15 an enlarged view of structure shown in FIGS. 1 and 10.

FIG. 16 is an sectional view taken along the line 16—16 in FIG. 17.

FIG. 17 is a elevation view of the brew cavity being centered by the cylinder shown in section.

FIG. 18 is a view similar to FIG. 17 but with the cylinder sealed relative to the brew cavity.

FIG. 19 is a sectional view taken along the line 19—19 in FIG. 1.

FIGS. 20-28 diagrammatically illustrate the cam functions in one complete cycle.

DETAILED DESCRIPTION

Referring to the drawing in detail, wherein like numerals indicate like elements, there is shown in FIG. 1 the front elevation view of a brewing mechanism in accordance with the present invention designated generally as 10. The mechanism 10 includes a housing defined by front wall 12, rear wall 14, and side walls 16, 18. The front and rear walls are preferably molded from plastic but may be die cast from metal or may be made of other materials. The frame is designed so that all stress and functional loads are transferred to the walls whereby screws and other fasteners are free of forces and loads and serve only the function of holding the assembled parts in proper orientated position. As shown in FIG. 1, circular or rectangular projections are molded or die cast integrally in front wall 12 and rear wall 14. These projections such as 17 are designed to become captive and project into mating holes in side walls 16 and 18, but having a projected distance of slightly less than side walls 16 and 18. The projections 17 have a centrally located threaded hole to receive the side wall retaining screws 19. The retaining screws 19 have a washer faced based whose diameter is greater than the diameter of mating holes of said side walls 16 and 18.

The rear wall 14 provides the support for a base section designated generally as 20 and containing the filter and brew cavity to be described hereinafter. The side walls 16 and 18 are used to maintain proper orientation between the front and back walls 12 and 14. The side walls 16 and 18 may be of sheet metal which has been prepunched to accept mating structure on the other walls.

A front guide rod 22 is supported by the front wall 12 and a rear guide rod 24 is supported by the rear wall 14. As shown more clearly in FIG. 3, the guide rods 22 and 24 are generally diagonally opposite one another. All of the vertically moving center section components of the mechanism of the present invention are mounted on rods 22, 24. A brew cylinder 26 has a pair of ears 28. Each of the rods 22, 24 extends through one of the ears 28 at an elevation below the elevation of the bearing support 30 on rear wall 14 or a corresponding bearing support on the front wall 12. See FIG. 2. A similar bearing support guides the upper end of the rods 22, 24. A spring 32 surrounds each of the rods 22, 24 at an elevation above the bearing support 30. Thus, the cylinder 26 is fixed to and moveable with the rods 22, 24. Spring type retaining rings fit into grooves provided in rods 22 and 24 above and below ear 28 thereby tightly holding said rods to top and bottom surfaces of ear 28. Brew cylinder 26 has a sloped bottom 34 which extends to a reduced diameter opening 36 coaxial therewith.

Cylinder 26 is open at its bottom end by way of opening 36 and is open at its upper end as shown more clearly in FIG. 1. The opening 36 receives a removeable fine mesh screen which is retained in the opening by a spring type circular ring and prevents coffee grounds or other brew material from entering the cylinder chamber.

Figure 3:
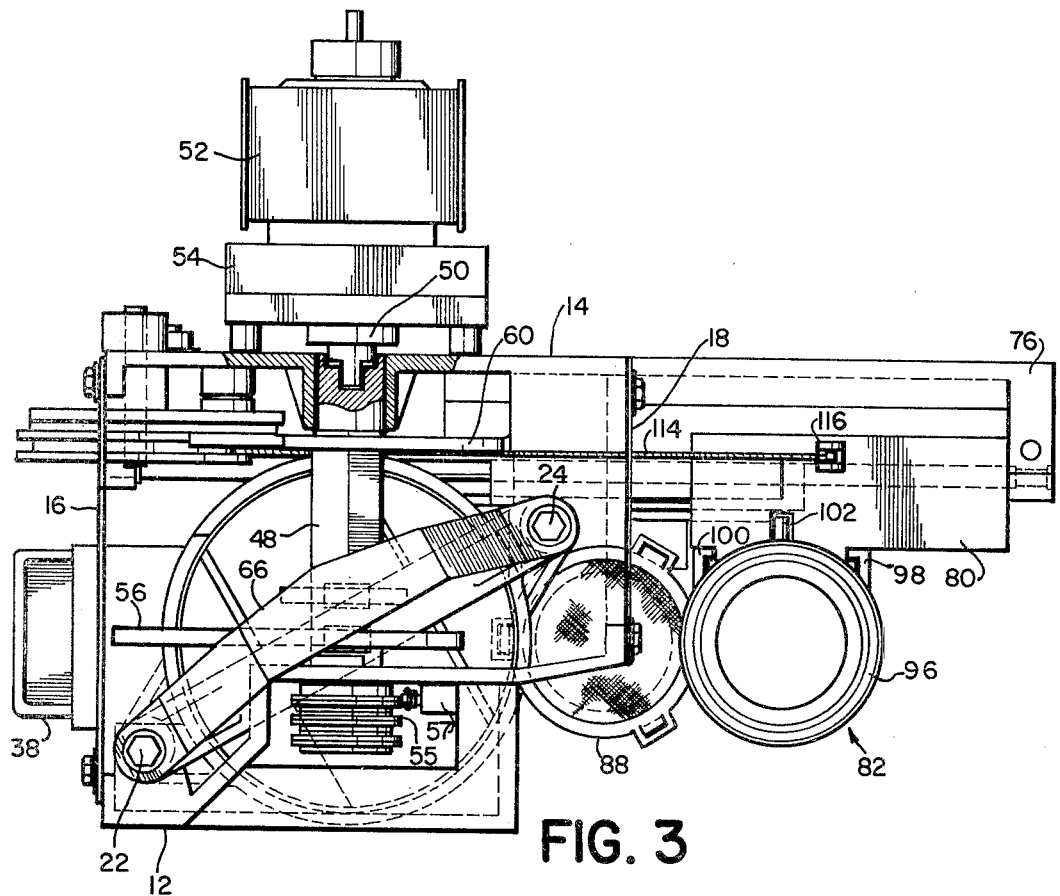
FIG. 3 is a top plane view of the mechanism.
Figure 8:
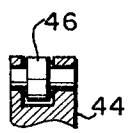
FIG. 8 is a view taken along the line 8—8 in FIG. 1.
Figure 7:
FIG. 7 is a view taken along the line 7—7 in FIG. 1.

Between its upper and lower ends, the cylinder 26 is provided with a series of inlet ports 27 communicating with a chute 38 shown in FIGS. 3 and 19. The chute 38 has a sloping bottom wall which communicates with ports 27 so that water may be introduced thereinto below the elevation of piston 40 when the piston is in its uppermost position. Piston 40 remains at all times within the cylinder 26. Piston 40 is comprised of upper and lower portions having sloping mating faces for clamping there between a sealed ring 42. A nut 41 provides for adjusting the clamping pressure. Nut 41 has peripheral notches for contact with a mating lug on a wrench.

The piston 40 serves as one bearing of a three point piston guide system to be explained hereinafter. Piston 40 has its upper end integrally connected to a U-shaped bridge 44. At the ends of bridge 44, there are provided guide holes through which one of the rods 22, 24 extend. The springs 32 at their upper ends contact the ends of the bridge 44. The lower ends of springs 32 rest on rings 31 which are fixedly attached to rods 22 and 24 in grooves prcvided therein. The springs 32 thereby apply a force between rings 31 and underside of bridge ends 44 biasing the piston upwardly. A cam follower 46 is provided at the bight of the bridge 44. The ends of the bridge 44 constitute a pair of bearing guides working as a three point suspension in conjunction with piston 40.

A camshaft 48 extends between the front and rear walls 12 and 14. Rear wall 14 is provided with an opening through which one end of the camshaft extends. As shown more clearly in FIG. 3, the end of the camshaft 48 which extends to the rear wall 14 is provided with a slot for receiving the tang on a motor shaft 50. The cam shaft 48 also contains a cylindrical counterbore which accepts the cylindrical section of the motor shaft 50, thus insuring positive concentricity with the cam shaft 48. Motor shaft 50 is connected to drive motor 52 by way of a speed reducer 54. Motor 52 and speed reducer 54 are supported by the rear wall 14. Since the ends of the camshaft 48 are supported by the front and rear walls 12, 14 respectively, these walls absorb all loads. Three cams are fixedly secured to the camshaft 48 in a convenient manner. The cams are designated 56, 58 and 60.

Figure 2:
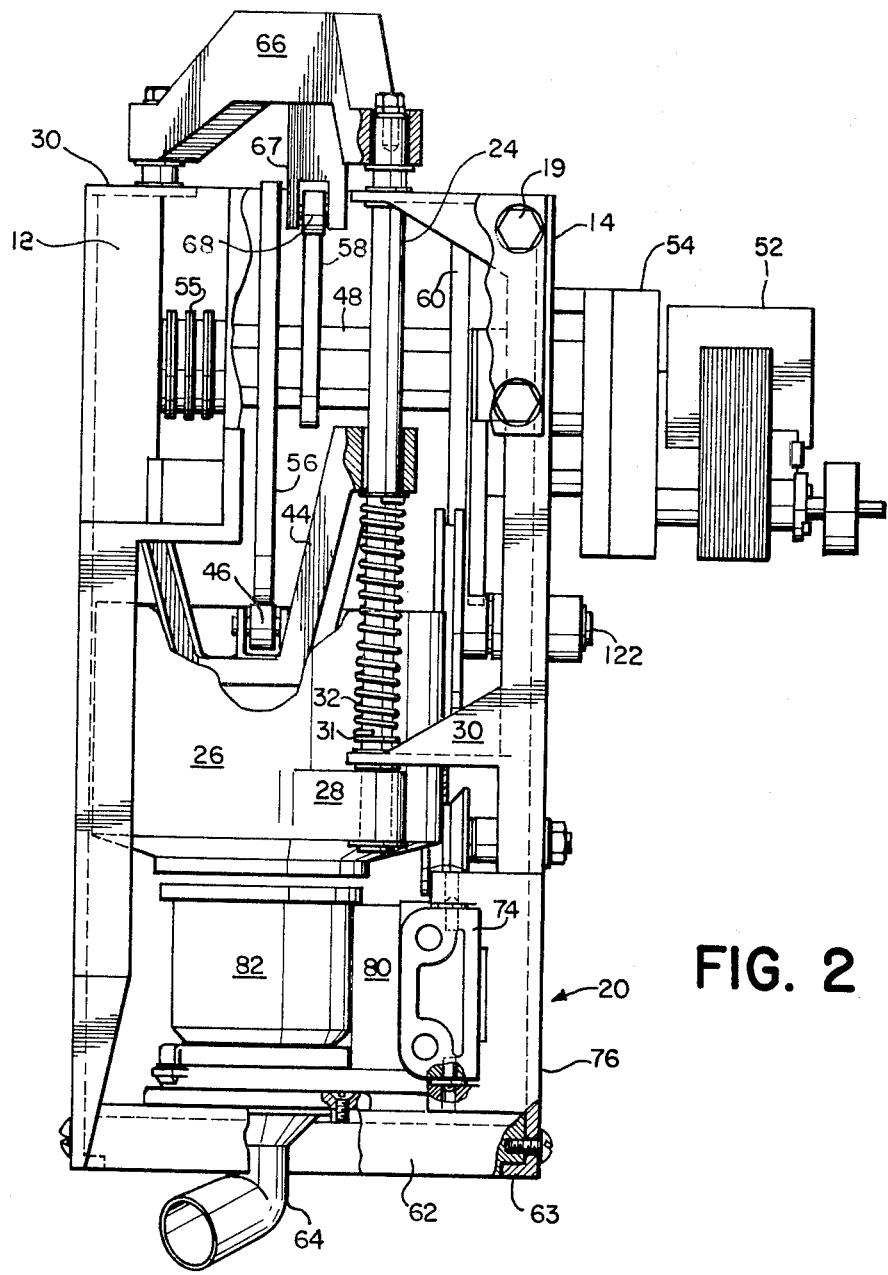
FIG. 2 is a side elevation view of the mechanism shown in FIG. 1 as seen from the right.

As shown in FIGS. 2 and 3, the end of cam shaft 48 remote from motor 52 extends through an opening in front wall 12. A cylindrical hub, whose periphery is provided with a plurality of teeth, is fastened to the end of the camshaft 48. A seris of like cams 55 are provided. Each cam 55 is comprised of two identical pieces which are reversedly placed face to face forming one cam section. Each individual cam piece is a circular ring having one half of its periphery being a high section and one half being a low section. The center of the low section is split or severed allowing it to be a spring like ring. Internally located at the split only, there is provided a series of teeth which mate with teeth on the outer periphery of the hub. Each cam section can be rotated to provide desire timing to control the functions of the brew mechanisms or associated controls. Each cam 55 actuates one of a plurality of switches 57. Each cam 55 has a plurality of teeth on its inner periphery and is circumferentially adjustable relative to mating teeth on the other periphery of shaft 48. Switch 57 may be used to control flow of hot water to cylinder 26.

Referring particularly to FIG. 2, the lower end of the front wall 12 and rear wall 14 are interconnected by a funnel support 62. The funnel support 62 is designed to take the maximum forces developed when the mechanism 10 is under maximum operating pressure. The funnel support 62 is supported by projections 63 on the front and rear walls and is lined up with the center of the mechanism 10. Any forces developed on the funnel support 62 are transferred directly to the front and rear walls 12 and 14. A plastic molded funnel 64 extends through and is supported by the funnel support 62. The top of the funnel 64 has outwardly extending rectangular flange which is joined by screws or other types of fasteners to the funnel support 62. The bottom of the funnel 64 changes to a tubular section and forms an elbow changing direction whereby liquid flowing therethrough may be finally directed to a cup for receiving the brewed beverage.

A cylinder operating bridge 66 has its ends secured to the upper ends of the rods 22, 24. See FIGS. 1 and 2. The combination of the cylinder 26 being fixedly secured to the bottom of rods 22, 24 and the cylinder operating bridge 66 being fixedly secured to the top of rods 22, 24 provides a positive, rectangularly fixed central system for insuring parallelism of the rods 22, 24 and for insuring a smooth vertical operation of the moving central system. From the central section of the bridge 66 and slightly cantalevered or offset is a vertical arm extending downwardly. The arm is provided with a slot within which is rotatably supported a cam follower 68 which cooperates with cam 58.

Referring to FIGS. 9–12, there is illustrated details of the base section 20. Base section 20 is designed to be easily removed from the main section of the housing for ease of cleaning, sanitizing, maintenance, etc. The base section 20 includes upper and lower guide rods 70 and 72 and disposed one above the other. Referring to FIG. 10, the left hand end of the rods 70, 72 are not interconnected while the right hand end of the rods are interconnected by way of a retainer 74. The retainer 74 has detents as shown which are designed to snap into proper position in the extension 76 of the rear wall 14 as shown in FIGS. 1 and 3. The free end of the rods 70, 72 are freely supported by bell-mouth holes 78 on the left hand side of the rear wall 14 as shown more clearly in FIG. 1.

A brew cavity carriage 80 is slidably supported with three bearing points on the rods 70, 72. Carriage 80 supports a brew cavity 82. The rods 70, 72 also slidably support the screen and filter support carriage 84 with three bearing points. Carriage 84 has a an integral screen 89 on which is removably mounted the filter 88. The filter 88 comprises a molded plastic ring having an integrally molded nylon cloth filter 86 of micron size mesh. Filter 88 is snapped into position on carriage 84, and retains the silicone ring 91, which circumscribes and is flush with the top surface of molded screen 89. See FIGS. 9 and 13. Screen 89 is an integrally molded screen supported by a series of vertical ribs. The screen 89 is designed to take the maximum brewing pressure and at the same time prevent the removeable filter 88, from being ruptured due to the pressure. The open grid area of the screen 89 is defined by retangular openings tapered downwardly and is mathematically designed to create a desired back pressure during the brewing cycle thereby slowing the flow of the water through the mechanism and the brew cavity 82 so as to obtain maximum desired pressure. The open grid area in screen 89 also takes the downward pressure exerted during brewing and supports the nylon cloth filter 86 thereby preventing its rupture under the brewing pressure. The maximum desired pressure insures the proper amount of contact time between the water and the coffee or product to obtain the desired amount of brew extraction.

One end of the carriage 84 is designated 90. End 90 is designed to cooperate with a rod-like limit stop 92. One end of the limit stop 92 is fixedly secured to the retainer 74 and extends through an opening in the juxtaposed portion of carriage 80.

The brew cavity 82 may be molded of plastic into a cylindrical shape having an inner diameter in height designed to easily accept the amount of product required for brewing. The uppermost part of the cavity 82 has an outwardly extending flange 94 which overlies a small part of the top surface of the carriage 80.

The uppermost surface of flange 94 is grooved and receives therein a molded rubber or elastimeric seal ring 96. The inner diameter of the brew cavity 82 is tapered for most of its axial length with a funnel-like entrance at the top. See the phantom lines in FIGS. 12 and 17. The ratio of internal height to maximum diameter of brew cavity 82 is at least one so that every 8 grams of coffee has a height of about 2 cm.

Referring to FIGS. 9–12, the carriage 80 is provided with opposed vertical recesses each adapted to receive one of the vertical bearing guides 98, 100 on brew cavity 82. Carriage 80 also contains openings so as to receive a pair of pins 102, 103 disposed one above the other. Carriage 84 has a molded plastic spring pawl 104 for cooperation with pin 103 and a similar spring pawl 106 for cooperation with pin 102. The molded plastic spring pawls 104, 106 are identical in configuration with each serving a different function. These pawls are removeable and replaceable preferably by being snap fitted through holes in the vertical wall of the screen and filter support carriage 84. Referring to FIGS. 10 and 15, pawl 104 is fixedly secured to support 84 at its left hand end while extending horizontally to the right at its free end beyond the fixed end of pawl 106. Likewise, pawl 106 is fixedly secured to support 84 at its right hand end with its free end extending downwardly to the left and resting on pin 107 fixed to support 84. The cooperation of said pawls and pins will be described hereinafter. The pawls 104, 106 may be leaf springs.

Figure 11:
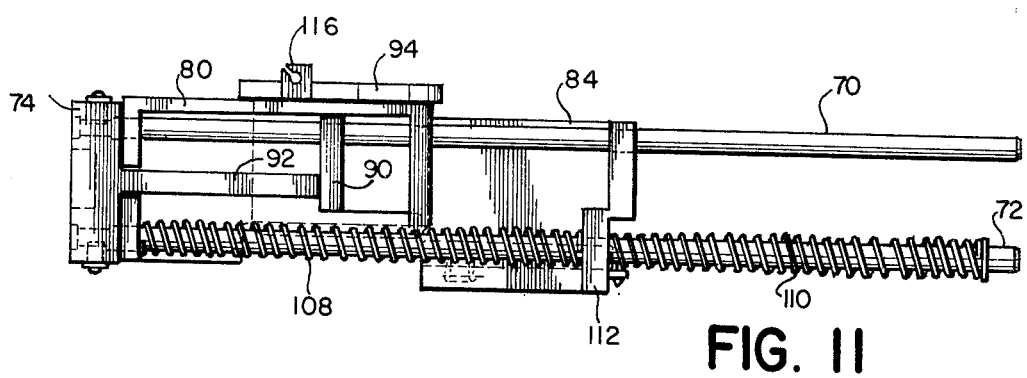
FIG. 11 is a rear view as seen along the lines 11—11 in FIG. 9.
Figure 12:
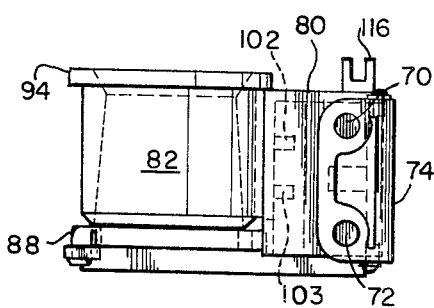
FIG. 12 is an end view as seen along the line 12—12 in FIG. 10.
Figure 14:
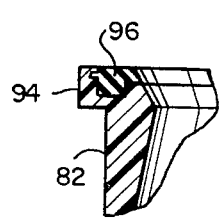
FIG. 14 is a sectional view taken along the line 14—14 in FIG. 9.

One of the rods 70, 72 such as rod 72 is provided with a right spring 108 and a left spring 110. The springs 108, 110 are coaxial with respect to the rod 72 and are separated from one another by portion 112 of the frame 84. Referring to FIG. 11 which is a rear view, the left hand end of spring 108 abuts against the carriage 80. The right hand end of spring 110 abuts against a retaining ring fixed to the rod 72 adjacent to its free end.

Figure 4:
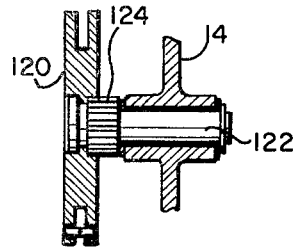
FIG. 4 is a view taken along the line 4—4 in FIG. 1.
Figure 6:
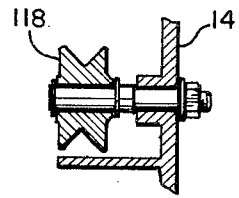
FIG. 6 is a view taken along the line 6—6 in FIG. 1.

Cam 60 in the camshaft 48 controls the functions of the base section 20. A cable 114 has one end removeably secured to a lug 116 on the top wall of the carriage 80. Cable 114 extends generally parallel to the rods 70, 72 and around a pulley 118 supported by the rear wall 14. See FIGS. 1 and 6. From the pulley 118, the cable 114 extends upwardly around a spool 120. Spool 120 is mounted on a shaft 122 which is rotatably supported by the rear wall 14. Between rear wall 14 and spool 120, the shaft 122 has a pinion 124. See FIG. 4.

Figure 5:
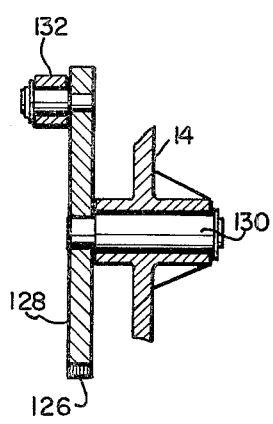
FIG. 5 is a view taken along the line 5—5 in FIG. 1.
Figure 9:
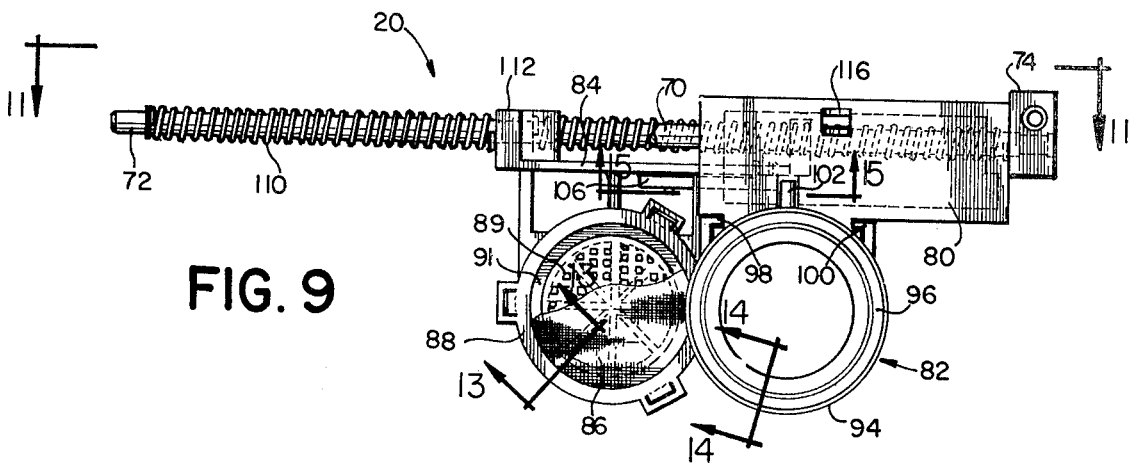
FIG. 9 is a plan view of the base assembly.

Referring to FIGS. 1 and 5, a gear segment 128 has teeth 126 which mesh with the teeth on pinion 124. Segment 128 is fixed to a shaft 130 rotatably supported by the rear wall 14. At the end of the segment 128 remote from the teeth 126, there is provided a cam follower 132 which cooperates with the cam 60. The teeth 126 form an arc which is approximately 45° of a full circle.

Camshaft 48 projects through front wall 12. The projecting section contains a removeable hub containing a series of adjustable cams 55. The cams 55 are used to control the various functions associated with the brewing mechanism, and to stop the mechanism at the exact same point after each cycle. These cams trip various switches in proper sequence. One cam is used to trip a switch 57, opening a water valve at the exact time and also measuring the exact amount of water allowed to enter the cylinder 26. Other cams and switches control the exact amount of coffee that is pre-stored in escrow in the coffee chute to be used for the next cycle. Other switches and cams can also control the amount of sugar etc. depending on the type of associated equipment the mechanism is used with. These functions can also be controlled by a series of discs, replacing cams 55 which would pick up a remote electronic pulse for controlling the valves.

FUNCTIONAL AND OPERATIONAL SEQUENCE

The mechanism 10 of the present invention can be set in either of two basic starting positions. One starting position is with the brew cavity 82 filled with a charge of coffee or other product and located in a position under the cylinder 26. The other position is with the brew cavity 82 in the discharge position as shown in FIGS. 1–3. Regardless of which starting position is used, the brew mechanism 10 goes through the same cycle and uses the same amount of time. For purposes of the present description, it will be assumed that the components are in the relative position associated with the first mentioned starting position.

The basic cycle includes introducing a predetermined amount of hot water through the chute 38 into the cylinder 26. At this point in time the lower edge of cylinder 26 is in contact with the seal 96 on the upper end of the brew cavity 82. The piston 40 starts downwardly and after passing the water entrance ports 27 in the side wall of cylinder 26, creates pressure forcing the water through the coffee or other product in brew cavity 82. The water extracts the brew and exits through the bottom funnel 64 for subsequent mixture with other products such as sugar, milk, etc. and is subsequently deposited into a cup or container.

When the piston reaches the bottom position, both piston 40 and cylinder 26 elevate simultaneously for a short distance such as 3 mm to clear the top of the brew cavity 82. The brew cavity 82 and filter 86 move simultaneously to the right in FIG. 1 for a predetermined distance at which point the filter halts. The brew cavity 82 continues to the right, is biased upwardly by contact between pawl 106 and pin 102, and then drops down sharply thereby ejecting spent coffee grounds. Cavity 82 follows the sequence of the positions designated X, Y, and Z in FIG. 15. Thereafter, the brew cavity 82 reverses direction and traverses to the left in FIG. 1 while picking up the filter 86 and at the same time receiving a new charge of previously measured coffee or other product from a chute not shown. The brew cavity 82 continues to the left in FIG. 1 and stops under the cylinder 26. The cylinder 26 then moves downwardly and engages the seal 96 at the top end of the brew cavity 82. This completes the basic cycle.

The following is an explanation of the basic cycle in greater detail while setting forth what is happening simultaneously and the structural interrelationship of various elements of the present invention. In connection with this detailed explanation, reference is made to FIGS. 20-28 which diagrammatically illustrate various features and relationships.

Figure 20:
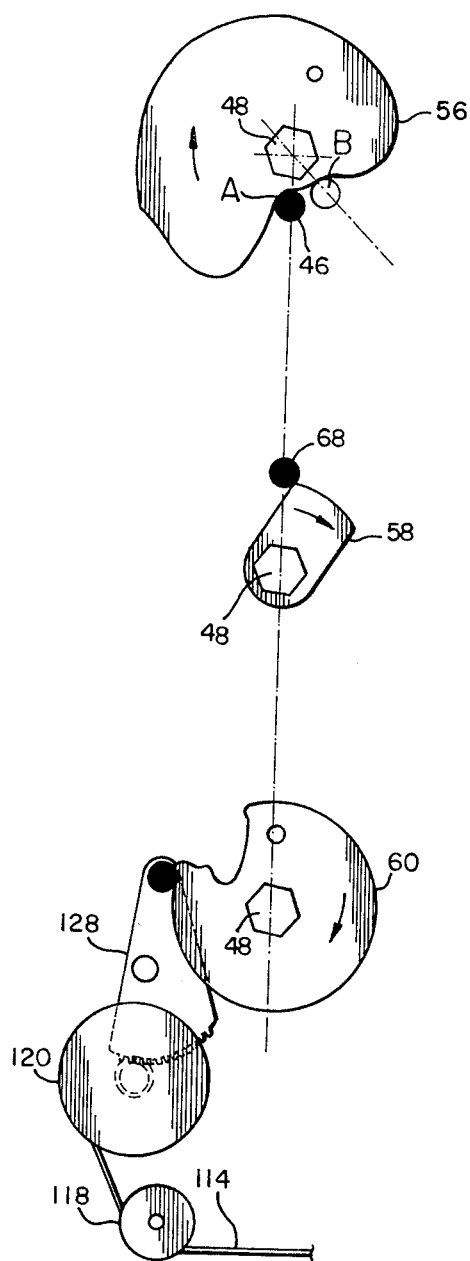
Figure 21:
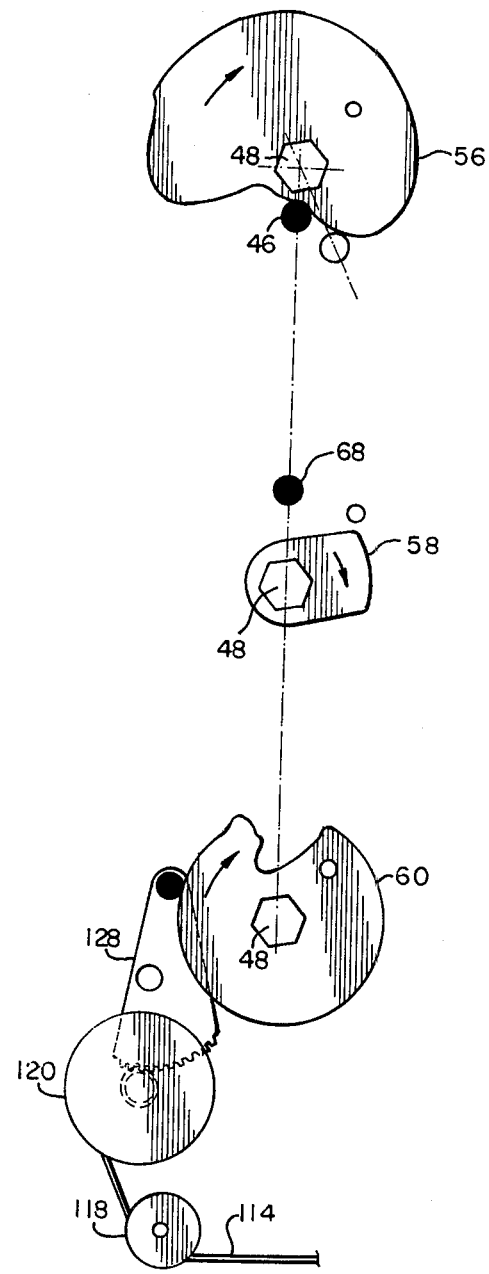
Figure 22:
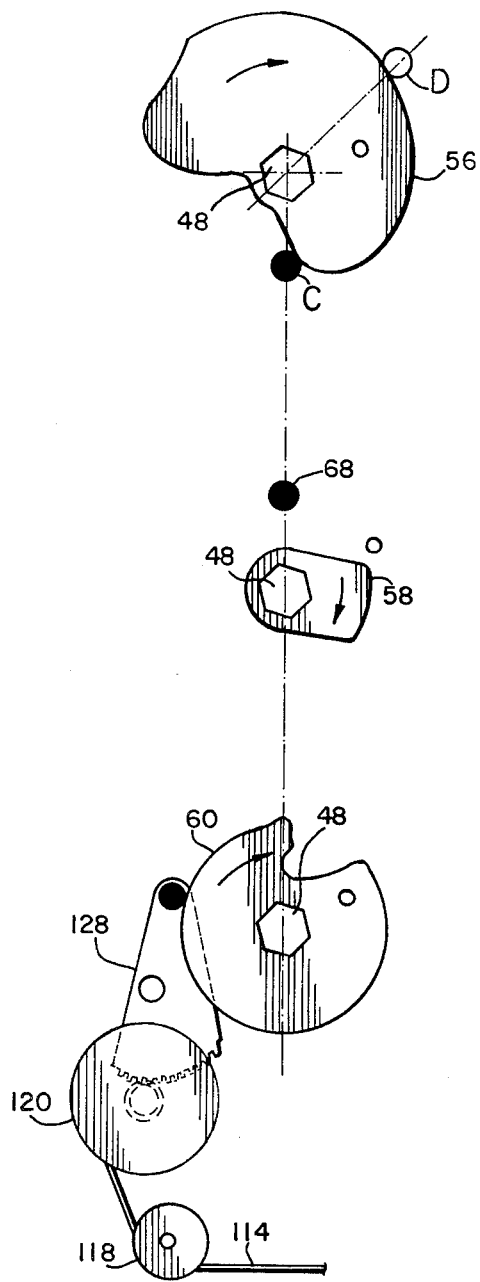

Upon initiation of an electrical input which may be responsive to introducing a coin into a dispensing mechanism, the motor 52 turns the main camshaft 48 clockwise in FIG. 20. As camshaft 48 rotates, it trips switch 57 for activating the valve which releases a predetermined amount of hot water through the chute 38 into the cylinder 26. The main camshaft continues rotating clockwise and the piston follower 46 is riding in a dwell section on the piston cam 56. See FIG. 20. As the piston moves downwardly, the arms 44 compress the springs 32 to insure a sealing pressure on seal 96 and silicone ring 91. After the piston has passed the water entrance ports 27 in cylinder 26, a layer of air is trapped between the top of the hot water surface and the bottom face of the piston. The air aids in the brewing function in two ways. First, the air immediately picks up heat from the hot water thereby causing the air to tend to expand. Secondly, the air rapidly builds up a pressure simultaneously with the downward motion of the piston against the hot air. The water is forced through the coffee thereby starting the extracting process. See point C in FIG. 22.

The shape of the piston cam 56 between points C and D is designed to gradually decrease the pressure on the hot water flowing through the coffee grounds and at the same time is designed to provide maximum contact time between the hot water and the coffee grounds. As the brewing procedure is taking place, the piston return springs 32 are continuously being compressed thereby increasing the sealing forces between the lower edge of the cylinder 26 and the brew cavity 82 as well as the sealing pressure between the bottom of the brew cavity 82 and ring 91 on filter 88.

Figure 23:
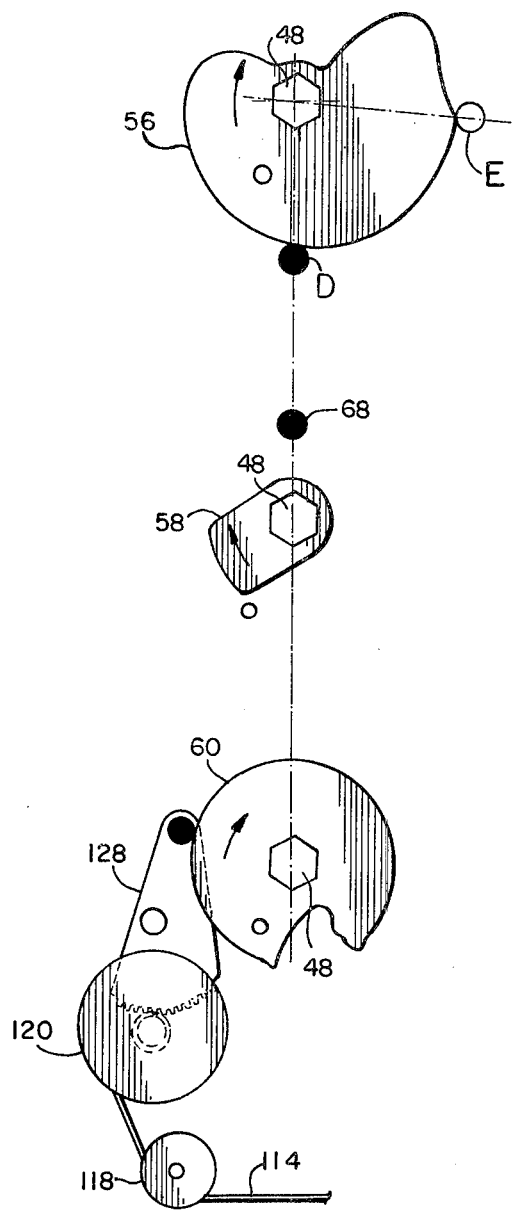
Figure 24:
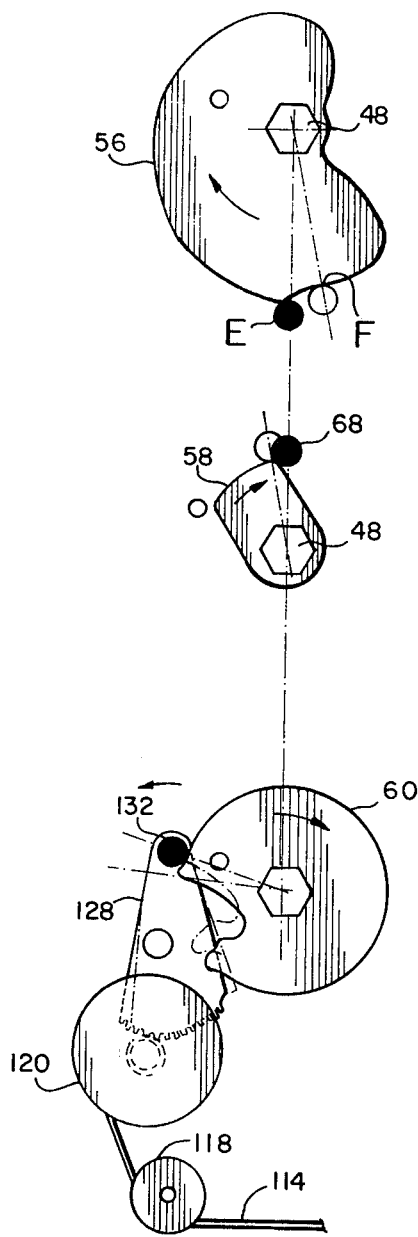
Figure 25:
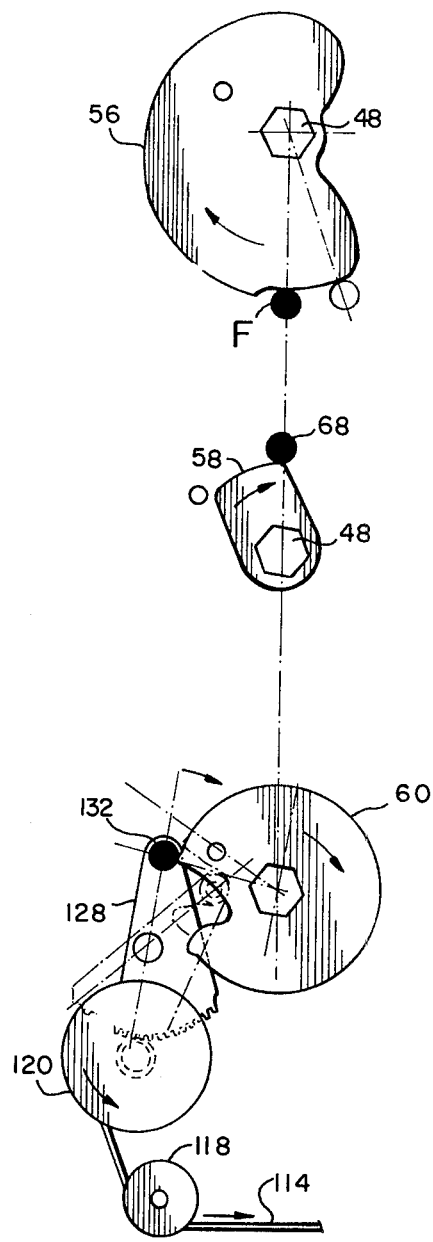

See points D and E in FIG. 23. Cams 58 and 60 are still non-functional. When the piston 40 reaches a downward position wherein all the hot water has been forced through the coffee grounds, the piston 40 continues downwardly at a slightly increased speed forcing the hot air through the spent coffee grounds or product bed and just prior to the end of the downward stroke, approaches zero downward acceleration. The acceleration point is designated E in FIG. 23. At point E in FIG. 23, the springs 32 have been compressed to the maximum position.

The hot air going through the spent coffee grounds dries out the grounds rendering them in a dry state so that they may be easily discharged. The approach to zero acceleration at the end of the piston's downward stroke is designed to eliminate a quick pressure release of the cylinder 26 and the sealing locations which could cause a spitting action when the seal between the brew cavity 82 and the cylinder 26 is released. When the piston 40 is travelling downward, all other operating cams are non-functional. As the piston 40 nears the end of its downward stroke, cam 60 moves the segment 128 slightly outwardly as the follower 132 rides up a slight incline on the cam 60. See FIG. 24. This rotation of the segment 128 turns the pinion 124 and spool 120. Any slack or looseness in the cable 114 is removed and cable 114 is put under a slight tension load and thereby preventing the brew cavity 82 from snapping or jumping to the right as the cylinder 26 and piston 40 start to rise.

Figures 26, 27:
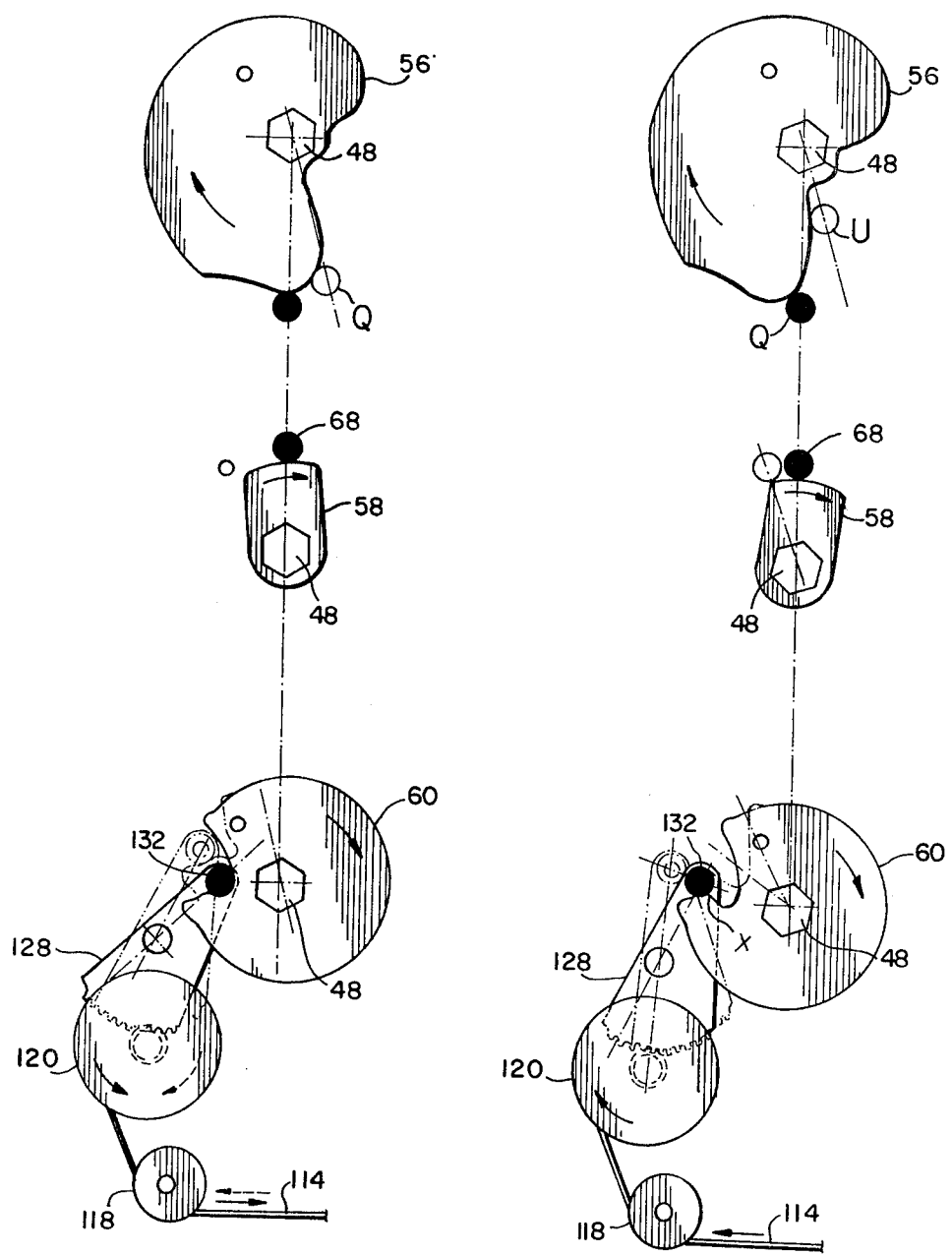
Figure 28:
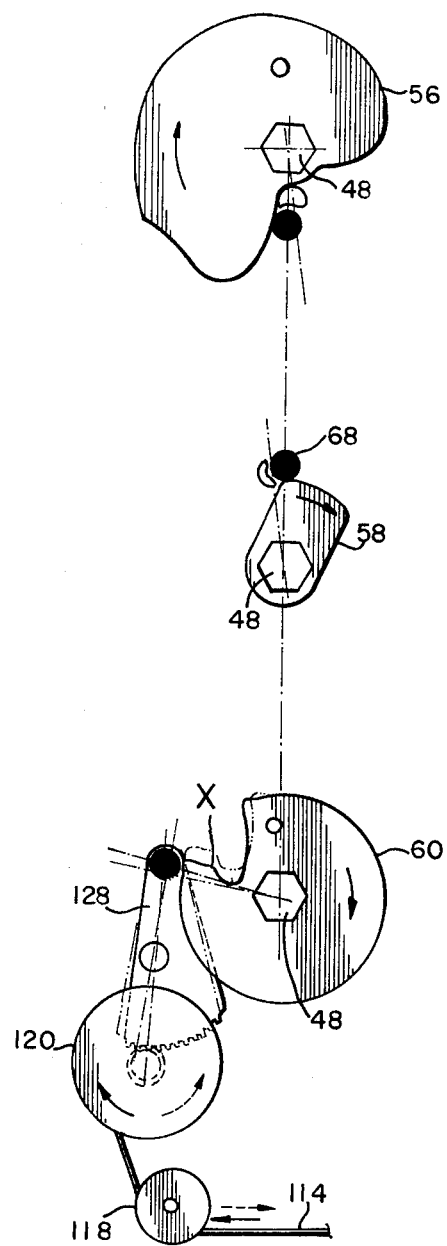

Cam 58 now engages the follower 68 on the bridge 66. See FIG. 25. Simultaneously, the piston cam 56 starts releasing the piston 40 which moves upward from point E to point F by the force of the springs 32. The piston 40 and cylinder 26 simultaneously start raising to a point just high enough to clear the top flange on the brew cavity 82. As shown in FIG. 26, the follower 132 on the segment 128 now enters the valley in cam 60. This commences the release of the cable 114 stored on the spool 120. The cable 114 is connected to the brew cavity carriage 80 and restricts the outward motion of both the brew cavity carriage 80 and the filter support carriage 84.

The filter support carriage 84 is biased outwardly by spring 110 which has a greater compress force than the spring 108. As the cable 114 is released, spring 110 expands thereby moving the carriages 80, 84 from left to right in FIGS. 1 and 10 with brew cavity 82 directly over filter 88. The carriage 80, restrained by cable 114, continues in that direction until carriage 84 contacts the limit stop 92. Carriage 80 continues to the right as spring 108 expands until it engages the retainer 74.

As the cavity 82 and its carriage 80 start to move away from the carriage 84, pin 102 on the brew cavity 82 makes contact with the top surface of the spring-like pawl 106. At the same time, pin 103 makes contact with the lower surface of the pawl 104. As the cavity 82 continues to move from left to right in FIG. 10, the contact between pawl 106 and pin 102 causes the cavity 82 to elevate. Pawl 106 is prevented from moving downwardly by the pin 107. Cam follower 132 is now at the bottom of the cavity on cam 60 as shown in FIG. 26.

As cam follower 132 approaches the bottom of the cavity of cam 60 there is a decrease in motional speed thereby preventing the carriage 80 from striking the retainer 74 with a great force which could throw the spent product grounds out of the top of brew cavity 82. As the brew cavity 82 moves upwardly from position X to Y, pin 103 moves upwardly thereby flexing pawl 104 upwardly to the phantom position shown in FIG. 15.

When the brew cavity 82 reaches its extreme top position Y, pin 102 rides off the end of the pawl 106. The energy stored by flexing pawl 104 is now released thereby snapping the brew cavity 82 downwardly until its circular top flange 94 contacts the top surface of the carriage 80. This downward motion and abrupt stop of the brew cavity 82 at position Z causes the dried out spent coffee grounds to break completely and freely from the brew cavity 82 and fall into a strategically located waste receptacle.

As the outward motion of the brew cavity 82 was being executed, the piston cam follower 46 is on a high dwell position still retaining almost all of the maximum force of the return springs 32 which are in their compressed state. See FIG. 26. The segment 128 has rotated sufficiently so as to release all of the cable 114 that was required, and cam follower 132 is in its maximum inward position at the bottom of the valley on cam 60.

As the brew cavity carriage 80 is pulled by the cable 114 and starts back toward the center of the brew mechanism, follower arm 132 moves rapidly out of the valley of cam 60. See FIG. 27. The piston cam follower 46 moves off its high dwell section starting to release the energy stored in the springs 32. The downward slope of the piston cam 56 is so designed and arranged to almost zero out the force required to pull the base section 20 back to its initial position under the brew cylinder 26 and compress springs 108, 110. The springs 32 exert a high force on the piston cam follower 46 which in turn exerts a high turning force on the piston cam 56 tending to drive or cause rotation in the direction that the motor is turning the camshaft 48. In the downward slope of the piston cam 56 as shown in FIG. 27 almost eliminates the driving force required by the motor 52.

As the brew cavity 82 continues moving to the left toward the center of the brewing mechanism, the pin 102 rides under the pawl 106 deflecting the latter upwardly. When the brew cavity 82 is in position over the filter 86, pin 102 moves out from under pawl 106 thereby allowing pawl 106 to return to its original position resting on pin 107. As the above sequence is happening, the spring 108 was being compressed. Since spring 108 is designed to have less force in its fully compressed state than spring 110 in its extended state, carriage 84 does not move until after the brew cavity 82 is located over the filter 86.

As the base section 20 is being pulled back to the center of the mechanism, the cam 60 was designed to rapidly accelerate the return motion until slightly prior to the cavity 82 being in its proper position over the filter 86. At this point on the cam 60, there is a lobe X which slows the return action of the brew cavity 82. This slowdown provides the time required for a tripper not shown but located on top of carriage 80 to trip open and discharge a fresh charge of ground coffee or other product into the brew cavity 82. Thereafter, carriages 80 and 84 continue to move to the left as a unit thereby compressing the spring 110. The base section 20 again accelerates and then slows down just as the brew cavity 82 approaches the center of the brew cylinder 26.

The brew cavity is pulled slightly passed or to the left of the center of the brew cylinder 26. As follower 68 is released by cam 58 (FIG. 28) cylinder bridge 66 and cylinder 26 are forced downward by the remaining force of springs 32 which push against retaining rings on rods 22 and 24. As the cam 58 starts to release follower 68 whereby cylinder 26 can descend and seal against the brew cavity 82, the cam 60 slowly allows the base section 20 to travel to the right back toward the center of the cylinder as shown in FIGS. 16 and 17. The flange 94 on the brew cavity 82 is timed to contact two small radial projections 93, 95 spaced approximately 90° apart on ring 97 on the bottom of the cylinder 26.

The projections 93, 95 are radially slightly closer to the center of the cylinder 26 than the ring 97. As the cylinder 26 travels downward these projections contact the edge 94 of brew cavity 82 and act as a "VEE" block to insure that the surface 99 on cylinder 26 will always contact the brew cavity seal ring 96 at the same point. As the edge of flange 94 of the brew cavity 82 contacts the projections 93, 95 the force of spring 110 is now transferred to the brew cylinder 26. Cam 60 continues to rotate allowing the cable 114 to become slack. The brew cavity carriage 80, the filter carriage 84, and the associated springs 110 and 108 are now restrained by the projections 93, 95. While the cable 114 is being slackened the cylinder 26 now moves a final small amount downward from the position in FIG. 17 to the position of FIG. 18. The final critical timing of this movement is performed by properly locating idler pulley 118. Pulley 118 is provided with horizontal adjustment in the rear wall 14.

At this point, a cut-off switch located externally on the front of the camshaft 48 drops into a valley on one of the cams 55 thereby interrupting the current source to the drive motor 52 and terminating the brew cycle. The stopping point can also be controlled by an electronic pickup when an electronic controller or microprocessor is used. The unit is now in its starting position.

The present invention is characterized by a number of features including the removability of the base section 20 which contains the brew cavity 82 and filter 86 in a manner which is simple and rapid while requiring little skill. The cams on camshaft 48 are designed so that expanding spring force assists in turning the cams in the same direction that they are driven by the motor 52 at the point and time when maximum turning power is needed whereby the size of the motor 52 may be smaller than that utilized heretofore. The shape of cam 56 gradually decreases the pressure to slow the flow of hot water through the coffee grounds and provide for maximum contact time between the hot water and the coffee grounds which is 20% more than that attained heretofore. The brew cavity 82 can receive a product bed which is 40% higher than prior art cavities. Instead of a 120 inch pound torque motor as used in said patent, the motor 52 may be a 60 inch pound torque motor.

The brew cavity 82 can be removed easily and independently from the base section 20 for ease of sanitizing or cleaning by sliding the filter carriage 84 slightly to the left thereby partially compressing spring 110 and allowing pin 103 to clear lower pawl 104. Brew cavity 82 can then be lifted vertically disengaging it from the carriage 80. Likewise the filter 88 can be easily removed from the screen 89 for service, maintenance, or replacement.

The present invention may be embodied in other specific forms without departing from the spirit or essential attributes thereof and, accordingly, reference should be made to the appended claims, rather than to the foregoing specification, as indicating the scope of the invention.

I claim:

1. A brewing mechanism comprising of frame, a vertically movable open-bottom cylinder supported by said frame, a vertically movable piston inset cylinder and supported by said frame, said piston being within said cylinder at the upper end of its stroke, first spring means biasing said piston upwardly and biasing said cylinder downwardly, means to facilitate entry of water into the cylinder below the elevation of said piston when the piston is at the upper end of its stroke, a base assembly reciprocable horizontally between a brewing position and a discharge position, said base assembly including a brewing cavity which is positionable beneath and sealed with the cylinder in the brewing position of the assembly, the second spring means biasing said assembly towards the discharge position, a camshaft driven by a motor, plurality of cams on said camshaft, a first cam follower on said piston, a second cam follower on said cylinder, each cam follower being in contact with a discreet one of said cams on said camshaft, said first spring means cooperating with one of said cams to aid said motor in moving said base assembly toward said brewing position.

2. A brewing mechanism in accordance with claim 1 wherein said piston and cylinder are vertically guided by only two vertical posts, an imaginary line interconnecting said posts being skewed at an acute angle with respect to the direction of reciprocal movement of said base assembly.

3. A brewing mechanism in accordance with claim 1 wherein said brewing cavity is removably attached to a carriage, said carriage being guided by first and second guide rods at different elevations, said carriage and guide rods being removable as a unit.

4. A brewing mechanism in accordance with claim 3 wherein said first guide rod is above and parallel to the second guide rod.

5. A brewing mechanism in accordance with claim 4 wherein said second spring means includes two discrete springs surrounding said second rod with one spring biasing said carriage and the other spring biasing a filter support guided for movement along said rods.

6. A brewing mechanism comprising of frame, a vertically movable open-bottom cylinder supported by said frame, a vertically movable piston in said cylinder and supported by said frame, said piston being within said cylinder at the upper end of its stroke, spring means biasing said piston upwardly, means to facilitate entry of water into the cylinder below the elevation of said piston when the piston is at the upper end of its stroke, a base assembly reciprocable horizontally between a brewing position and a discharge position, said base assembly including a brewing cavity which is positionable beneath and sealed with the cylinder in the brewing position of the assembly, a camshaft driven by a motor, a cam on said camshaft, a cam follower for said piston and in contact with said cam on said camshaft, said spring means cooperating with said piston and follower to rotate said cam to aid said motor in moving said base asembly toward said brewing position.

7. A brewing mechanism comprising a frame, a vertically movable open-bottom cylinder supported by said frame, a vertically movable piston in said cylinder and supported by said frame, said piston being within said cylinder at the upper end of its stroke, first spring means biasing said piston upwardly, means to facilitate entry of water into the cylinder below the elevation of said piston when the piston is at the upper end of its stroke, a base assembly reciprocable horizontally between a brewing position and a discharge position, said base assembly including a brewing cavity which is positionable beneath and sealed with the cylinder in the brewing position of the assembly, said piston and cylinder are vertically guided by only two vertical posts, an imaginary line interconnecting said posts being skewed at an acute angle with respect to the direction of reciprocal movement of said base assembly, said brewing cavity being removably attached to a carriage, said carriage being guided by first and second horizontally disposed guide rods at different elevations, said carriage and guide rods being removable as a unit.

8. A brewing mechanism in accordance with claim 7 wherein said first guide rod is above and parallel to the second guide rod.

9. A brewing mechanism in accordance with claim 8 wherein said rods are free from any interconnection at one end, said frame having a pair of recesses for receiving said free ends of the rods, a retainer at the other ends of the rods for removably coupling said rods to said frame.

10. A brewing mechanism in accordance with claim 7 wherein said carriage includes an inclined flexible pawl for causing the brewing cavity to elevate as it moves toward the discharge position, and a second flexible pawl which is flexed upwardly by said upward movement and thereafter biases said cavity downwardly against a limit stop to cause discharge of grounds from said cavity, said brewing cavity having a first projection for contacting said first pawl and a second porjection for contacting said second pawl.

11. A brewing mechanism in accordance with claim 7 where said brewing cavity and a filter support are cantilevered from said rods.

12. A brewing mechansim in accordance with claim 7 wherein said piston including upper and lower portions adjustably clamped together, each piston portion having an upwardly converging surface between which a sealing ring is clamped, the outer periphery of said sealing ring projecting beyond the outer periphery of said piston at the lower end of the piston in sealing contact with said cylinder.

13. A brewing mechanism in accordance with claim 7 wherein the ratio of internal height to internal maximum diameter of the brewing cavity is greater than one.

* * * * *